March 26, 1929.　　　E. H. CAMFIELD　　　1,706,772

FILTER FOR TANKS

Filed March 2, 1927

E. H. Camfield
Inventor

By C. A. Snow & Co.
Attorneys.

Patented Mar. 26, 1929.

1,706,772

UNITED STATES PATENT OFFICE.

EARTHEN H. CAMFIELD, FLORENCE, COLORADO.

FILTER FOR TANKS.

Application filed March 2, 1927. Serial No. 172,061.

This invention relates to a filter designed primarily for use in connection with the fuel tanks of motor vehicles although it can also be used wherever it is designed to filter the air admitted to a tank containing liquid.

One of the objects of the invention is to provide a simple form of closure for the filling opening of the tank whereby the suction of air into the tank due to the withdrawal of liquid therefrom, will not result in the introduction of impurities into the tank but, on the contrary, will cause the incoming air to be thoroughly filtered so as to exclude all foreign substances.

A further object is to provide a device of this type which can also be used to facilitate filling of the tank.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Figure 1:
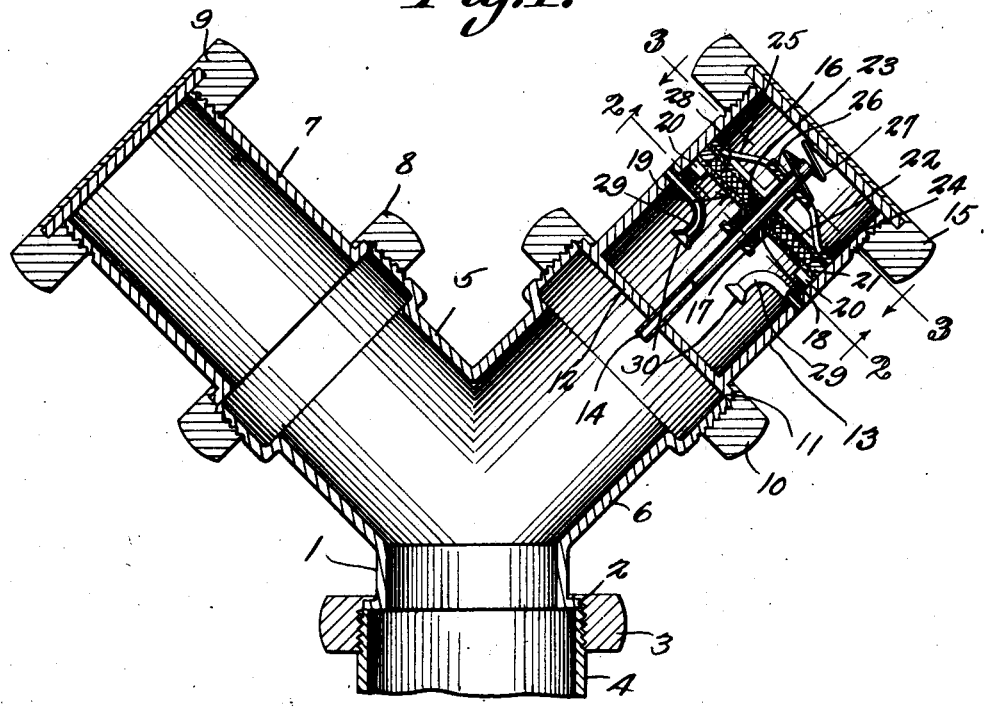
Figure 1 is a section through the device in position at the filling opening of a tank.
Figure 2:
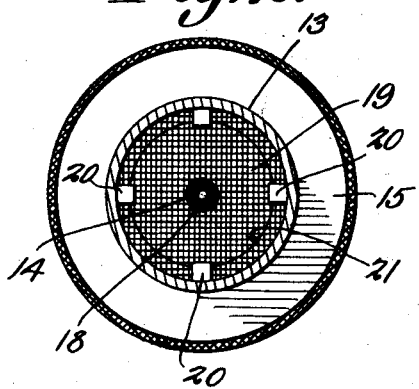
Figure 2 is a section on line 2—2, Figure 1.
Figure 3:
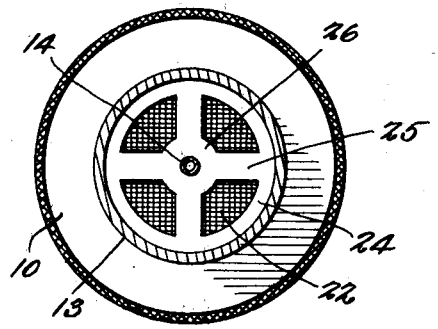
Figure 3 is a section on line 3—3, Figure 1.

Referring to the figures by characters of reference 1 designates the tubular base of the attachment provided with a flange 2 at its free end adapted to be fastened by means of a coupling ring 3 to the end of the filling neck or pipe 4 extending from the tank or the like to be filled. The base 1, in the structure illustrated, has upwardly diverging tubular arms 5 and 6 providing a Y construction, one of the arms having a tubular extension 7 clamped to the end thereof by means of a coupling ring 8 while a screw cap 9 or the like is used for closing the outer end of the tubular extension.

The arm 6 has the filter, which constitutes the present invention, clamped to the outer end thereof by means of a coupling nut 10 which laps an annular flange 11 extending from the closed end 12 of the tubular casing 13 of the filter. Opening through and soldered or otherwise connected to the center of the closed bottom 12 of casing 13 is a tube 14 opening at one end into the arm 6 and at the other end into the housing or casing 13 close to the outer end thereof. A screw cap 15 is provided for closing the outer end of the housing or casing 13 and may be provided with a suitable packing disk such as shown, for example, at 16. Arranged on the tube 14 is a collar 17 constituting an abutment for a spacing sleeve 18 carried by the tube and supporting a disk 19 formed of a wire fabric. Lugs 20 extend inwardly from the casing at desired intervals and serve to support the marginal portion of the screen disk 19. A spacing ring 21 is mounted on the marginal portion of the screen disk 19 and supports the marginal portion of another screen disk 22 which is fitted around the tube 14, there being a spacing sleeve 23 interposed between the screen disk and mounted on the tube. A clamping ring 24 bears upon the peripheral portion of the screen disk 22 and is connected by converging arms 25 to a ring 26 movably mounted on the tube. A spring 27 bears against the ring 26 and against the closure packing 16. Thus, when the closure is tightened on the housing or casing 13, it places spring 27 under compression and causes the ring 24 to bind together the marginal portions of the screen and the spacing ring 21 and the spacing sleeve 23 can be filled with a fabric disk 28 formed of cotton or wool fibers or the like and constituting an efficient filtering medium. Opening through the wall of the housing or casing 13 are one or more tubes 29 which curve toward the closed end 12 of the casing 13 and are preferably formed with flared inner ends as shown at 30.

In practice the device already described is applied to the filling pipe or neck 4. By removing the closure 9 fluid can be supplied to the tank by pouring it through the extension 7 and the arm 5. Thereafter the cap 9 can be replaced. As the fluid is withdrawn from the tank (not shown) from which the neck or pipe 4 is extended, a suction will be set up which will cause air to enter the casing 13 through the tubes 29. This air will then be drawn through the screen 19, filtering material 28, screen 22, and thence to the outer end of tube 14 through which it will be sucked into the arm 6. In its movement through the filter the air will of course be freed of impurities in the form of minute solids.

By providing the extension 7 the filling of a tank on some types of automobiles and the like will be facilitated. However this extension 7 need not be used unless so desired. As a matter of fact the entire device can be made with but a single tubular arm on which the filter is mounted, the filling arm being dispensed with.

What is claimed is:

An air filtering attachment for liquid containers including a casing having closed ends, means for coupling one of said ends to the inlet of a container, a tube extending through said end for conducting air from the casing, filtering means mounted on the tube and dividing the interior of the casing into separate compartments, one end of said tube opening into one of the compartments, a support in the casing for the filtering means, an air inlet opening into the other compartment, said filtering means including separate screens, a spacing ring therebetween, and a fibrous filtering material surrounded by the ring and between the screens, and yielding means for holding the filtering means against the support.

In testimony that I claim the foregoing as my own, I have hereto affixed my signature.

EARTHEN H. CAMFIELD.